United States Patent [19]

Centala

[11] Patent Number: 4,553,210
[45] Date of Patent: Nov. 12, 1985

[54] COMPLEMENTED ROLL ATTITUDE FLIGHT CONTROL SYSTEM

[75] Inventor: John P. Centala, Marion, Iowa

[73] Assignee: Rockwell International Corporation, El Segundo, Calif.

[21] Appl. No.: 408,962

[22] Filed: Aug. 17, 1982

[51] Int. Cl.[4] .............................................. G06F 15/30
[52] U.S. Cl. .................................... 364/434; 318/585; 244/179
[58] Field of Search ............... 364/434, 424, 431, 432, 364/433; 318/584, 585, 586; 244/181, 182, 183, 184, 195, 179, 180

[56] References Cited

U.S. PATENT DOCUMENTS

| | | | |
|---|---|---|---|
| 3,057,584 | 10/1962 | Bretoi | 364/434 |
| 3,147,424 | 9/1964 | Miller | 244/180 |
| 3,417,945 | 12/1968 | Reynolds et al. | 244/184 |
| 3,901,466 | 8/1975 | Lambregts | 364/434 |
| 4,148,452 | 4/1979 | Niessen et al. | 364/434 |
| 4,198,017 | 4/1980 | Murray | 364/434 |
| 4,330,829 | 5/1982 | Fischer et al. | 364/434 |
| 4,343,035 | 8/1982 | Tanner | 364/434 |
| 4,371,939 | 2/1983 | Adams et al. | 364/434 |

Primary Examiner—Errol A. Krass
Assistant Examiner—Thomas G. Black
Attorney, Agent, or Firm—George A. Montanye; H. Fredrick Hamann

[57] ABSTRACT

A system and technique is disclosed which provides a complemented roll attitude signal for use in the control system of an aircraft. The complemented roll attitude is produced by combining a yaw rate and true airspeed signal with a conventional roll attitude signal to produce a complemented signal which may be combined with a roll command signal to produce a roll steering signal for controlling aircraft response under non-zero roll attitude conditions of aircraft flight. The complemented roll attitude signal provides improved response to aircraft roll commands under non-zero roll attitude conditions, particularly in helicopter systems.

11 Claims, 3 Drawing Figures

COMPLEMENTED ROLL ATTITUDE FLIGHT CONTROL SYSTEM

BACKGROUND OF THE INVENTION

The present invention relates to aircraft control systems and techniques and more particularly, to a system for improving roll response in helicopter control systems.

In fixed wing aircraft control systems of the prior art, a roll command signal and a roll attitude signal are conventionally subtracted from one another to provide an error signal designated as the roll steering signal. The roll steering signal is then coupled as input to an automatic flight control system or exhibited as an error signal so that a pilot may discern when a commanded roll has been achieved. The roll steering command thus causes movement of the aircraft to perform a roll until the roll attitude signal subtracts from the commanded roll to produce the desired attitude and causing the roll steering signal output to be zero.

In a fixed wing aircraft, where the aircraft normally flies a fixed heading with a zero roll attitude, there is very little difficulty in combining the roll attitude and roll command signals to produce the roll steering signal needed to control aircraft roll movement. In some fixed wing configurations, and more particularly in helicopter flight configurations, the aircraft is normally maintained in a non-zero roll attitude even while flying a fixed heading. In this configuration, the roll attitude signal introduces an offset into the roll steering signal of the flight control system which must be compensated for in order to prevent the steering signal from causing a change in aircraft roll attitude when none is required.

In some prior known systems, the offset which would normally be introduced into the roll steering signal of the flight control system has been overcome by use of a limited high pass filter on the roll attitude output signal. In such instances, the high pass filter essentially cuts off any roll attitude signal below predetermined limits by use of a washout filter which enables a response to a commanded roll above those limits. Thus, if the aircraft is required to fly with a non-zero roll attitude, the washout filter will cause the roll attitude to be zero over the long term, yet allow a response to commanded roll during operation of the aircraft to produce the necessary steering signals.

One of the primary disadvantages of the above technique, however, is that for roll attitudes smaller than the limits on the high pass or washout filter, the low frequencies of the roll attitude signal are filtered out, resulting in reduced damping of the roll axis control system and overcompensation in aircraft movement in response to a commanded roll. This results from the presence of a commanded roll signal but no roll attitude signal when the roll attitude signal falls outside the passband of the washout filter. In aircraft which normally maintain a zero roll attitude during pilot flight and autopilot control, the offset signal for non-zero roll attitude is not a significant problem. However, in helicopter systems, where a non-zero roll attitude is the norm, use of the above and similar systems provides undesirable system control and response during aircraft operation.

Accordingly, the present invention has been developed to overcome the specific shortcomings of the above known and similar techniques and to provide an aircraft control system having a more natural and smooth response to various aircraft flight conditions.

SUMMARY OF THE INVENTION

In accordance with the present invention, a conventional yaw rate signal in the control system of an aircraft is combined with a true airspeed signal obtained from conventional sensors in a manner designed to multiply yaw rate and airspeed. The multiplied output is then summed with the roll attitude signal and provided as input through a limiter and low pass filter. The filtered output signal is then summed with the roll command signal and passes through another limiter where it is combined with the roll attitude signal to produce a roll steering signal. The roll steering signal is then used to control aircraft roll to null the steering signal and produce the desired roll in response to the roll command. The combined output of the low pass filter with the roll attitude signal functionally performs similar to the use of a high pass filter in the roll attitude channel to eliminate the offset signal for nonzero roll attitude operation, particularly in helicopter systems.

It is therefore a feature of the invention to provide a simple system and technique for providing roll attitude control in an aircraft control system.

It is another feature of the invention to provide a roll attitude signal for enabling improved system response during non-zero roll attitude aircraft operation.

Still another feature of the invention is to provide a roll attitude signal in combination with a yaw rate and airspeed signal for producing a complemented roll attitude signal for use in producing a roll steering command in an aircraft control system.

Yet another feature of the invention is to provide a roll steering circuit in an aircraft control system which combines a roll command signal and modified roll attitude signal to produce an improved error signal for controlling aircraft response to roll commands.

Still a further feature of the invention is to provide a helicopter automatic flight control system which improves helicopter roll response for non-zero roll attitude flight conditions.

These and other advantages and novel features of the invention will become apparent from the following detailed description when considered with the accompanying drawings wherein:

DETAILED DESCRIPTION OF A PREFERRED EMBODIMENT

Figure 1:
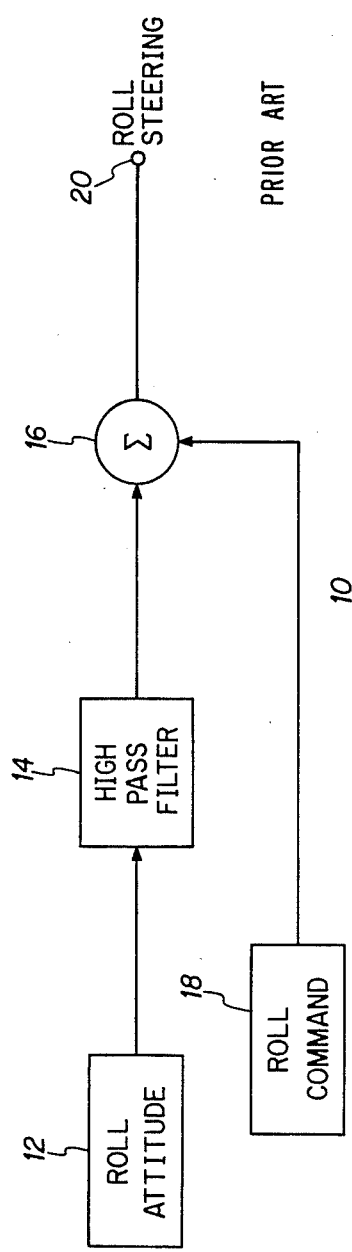
FIG. 1 is a schematic block diagram showing a prior known system.

Referring first to FIG. 1, wherein like numerals are used to refer to like elements throughout, a prior known aircraft control system 10 is shown which includes a roll attitude circuit 12 which provides an output indicative of the aircraft roll attitude as input to a high pass filter 14. The output of the high pass filter 14 is then coupled as one input to summing circit 16. The system 10 also includes a circuit 18 which provides an aircraft roll command which has its output coupled as a second input to summing circuit 16. The roll attitude signal from element 12 as modified by high pass filter 14 is subtracted in the summing circuit 16 from the roll command 18 to produce an error signal designated as a roll steering signal on the output 20.

During typical aircraft operation, in which an aircraft may normally be operating in a non-zero roll attitude, the outputs of various aircraft sensors are combined to provide the roll command signal at 18. This signal may be generated in any of numerous conventional circuits in accordance with prior known and prior art techniques. The roll command signal produces an output from which the roll attitude is subtracted, thereby producing an error signal represented by the difference between the roll attitude and roll command, which is in turn used as the roll steering signal to control aircraft movement. The error signal at the output 20 is coupled to the aircraft control system to cause aircraft roll until the error signal output from 20 becomes zero. This nulling or zeroing of the error signal from 20 will occur when the roll attitude signal from 12 matches the command roll signal from element 18. Likewise, when the roll command is removed or changed, the roll attitude signal will continue to be subtracted from the roll command signal to produce movement in an opposite direction until the roll attitude and roll command signals combine to produce a zero roll steering signal at the output 20.

As was previously noted, in fixed wing aircraft which normally fly a fixed heading at a zero roll attitude, the high pass filter 14 is not required and the combination of roll attitude from unit 12 and roll command from unit 18 will normally operate to produce a roll steering signal which responds naturally to aircraft control conditions. In a fixed wing aircraft configuration where it is necessary to maintain a non-zero roll attitude, or in a helicopter configuration where a non-zero roll attitude is normally maintained during fixed heading flights, the roll attitude output from 12 would always be providing a signal into the summing circuit 16 and thereby introduce an offset into the roll steering signal of the flight control system.

In order to overcome the offset for proper operation of the flight control system during such non-zero roll attitude flight conditions, prior known techniques have employed the high pass filter 14 to eliminate the offset. In this configuration, the high pass or washout filter 14 causes the system to respond only to roll attitudes at frequencies greater than the predetermined lower limit, thereby filtering low frequencies from the roll attitude signal. As is known, the high pass filter 14 provides an essentially zero long-term roll attitude output, thereby eliminating the offset which would normally be produced in the roll steering signal. During operation, the filter 14 will respond to high frequency roll command signals from input 18 since the high pass filter 14 will pass the roll attitude signals at frequencies above the filter limit cut-off frequency. However, for low frequency roll attitude signals, the high pass filter will block output at 14 and the roll command 18 will cause the output at 20 to be of a magnitude greater than necessary to produce the required commanded roll because of the lack of damping caused by the normal signal output at 12. The aircraft response is therefore underdamped and less desirable for aircraft control.

Figure 2:
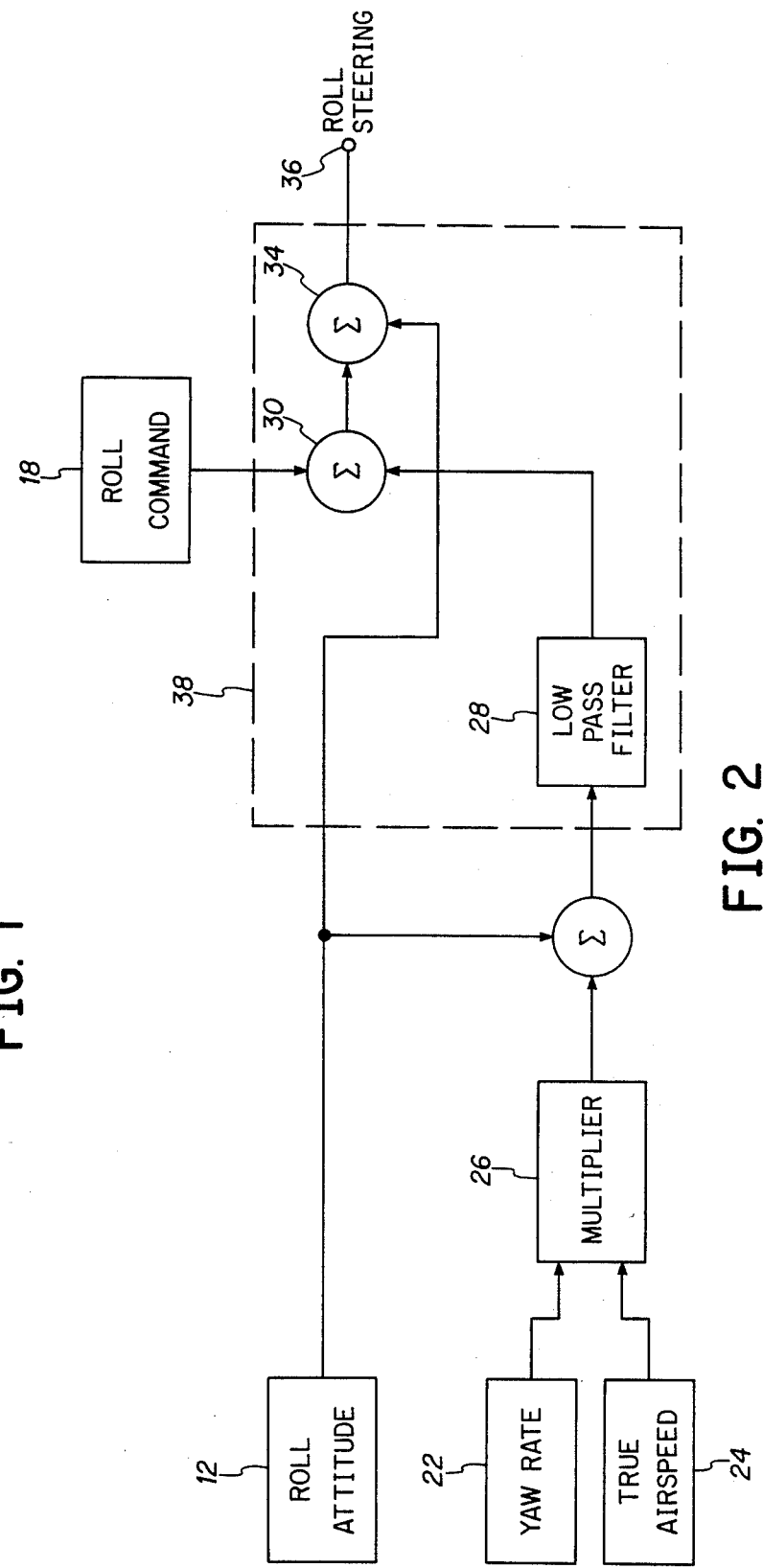
FIG. 2 is a schematic block diagram functionally showing the aircraft control system of the present invention.

Referring now to FIG. 2, a system and technique is schematically shown which generates a complemented roll attitude signal capable of being combined with the roll command to produce a roll steering signal for improved aircraft response. The system includes a circuit 12 for providing a roll attitude signal of the same conventional construction as that utilized in FIG. 1. The system also includes a roll command circuit 18 which again may be of a conventional design to provide a roll command for various aircraft sensors. The system also includes conventional circuits 22 and 24 which provide yaw rate and airspeed, respectively, from conventional sensors and detecting circuitry within an aircraft. The provision of the roll attitude, roll command, yaw rate and airspeed signals by aircraft circuitry is conventional and a further detailed description is unnecessary for an understanding of the present invention.

In accordance with the present technique, the yaw rate signal from 22, normally designated in degrees per second, and the airspeed signal from 24, normally designated as true airspeed in terms of knots, are coupled to a multiplier 26 which has its output in turn coupled to one input of a summing circuit 27. The output from roll attitude circuit 12 is coupled as a second input to the summing circuit 27 where it is combined with the output of multiplier 26 resulting in a signal at the output of summing circuit 27 which is provided to a circuit 28 acting as a low pass filter. The output of the low pass filter 28 is in turn coupled as one input to a summing circuit 30 which has a second input coupled to receive a roll command signal from roll command circuit 18.

The output of the summing circuit 30 may generally be characterized as a roll command plus roll attitude offset signal which is coupled as one input to a summing circuit 34. The other input of summing circuit 34 is coupled to receive the roll attitude from roll attitude circuit 12. The roll attitude at the one input to summing circuit 34 is subtracted from the sum of the signals from roll command 18 and low pass filter 28 as the roll command plus roll attitude offset output from 30. This output is then provided from 34 as the roll steering signal at the output 36. As in conventional control systems, the roll steering signal is used to cause aircraft roll movement to cause the output at 36 to null or go to zero.

In operation, the above circuit produces a signal at the output of low pass filter 28 which enables a modification of the roll command signal for low frequency roll commands, thereby providing a damped response that was incapable of being obtained in the system 10 of FIG. 1. In fixed wing aircraft configurations requiring a non-zero roll attitude during normal fixed heading flight, or in helicopter flight operations having nonzero roll attitude during normal flight operations, the summation of the roll attitude output through 27 and low pass filter 28 to summer 30 and the subtraction of the roll attitude signal in summing circuit 34 essentially cancels any offset that would normally be introduced for the non-zero roll attitude. This combination, however, does not eliminate the low frequency response that may be provided through the low pass filter 28 since the output of multiplier 26, couled through summing circuit 27 to low pass filter 28 continues to provide the signal for the low frequency components of roll attitude. As will be understood, roll attitude and yaw rate are related in a coordinated turn, thereby enabling the modification of the roll attitude signal to provide damping of the low frequencies of the roll attitude signal.

Figure 3:
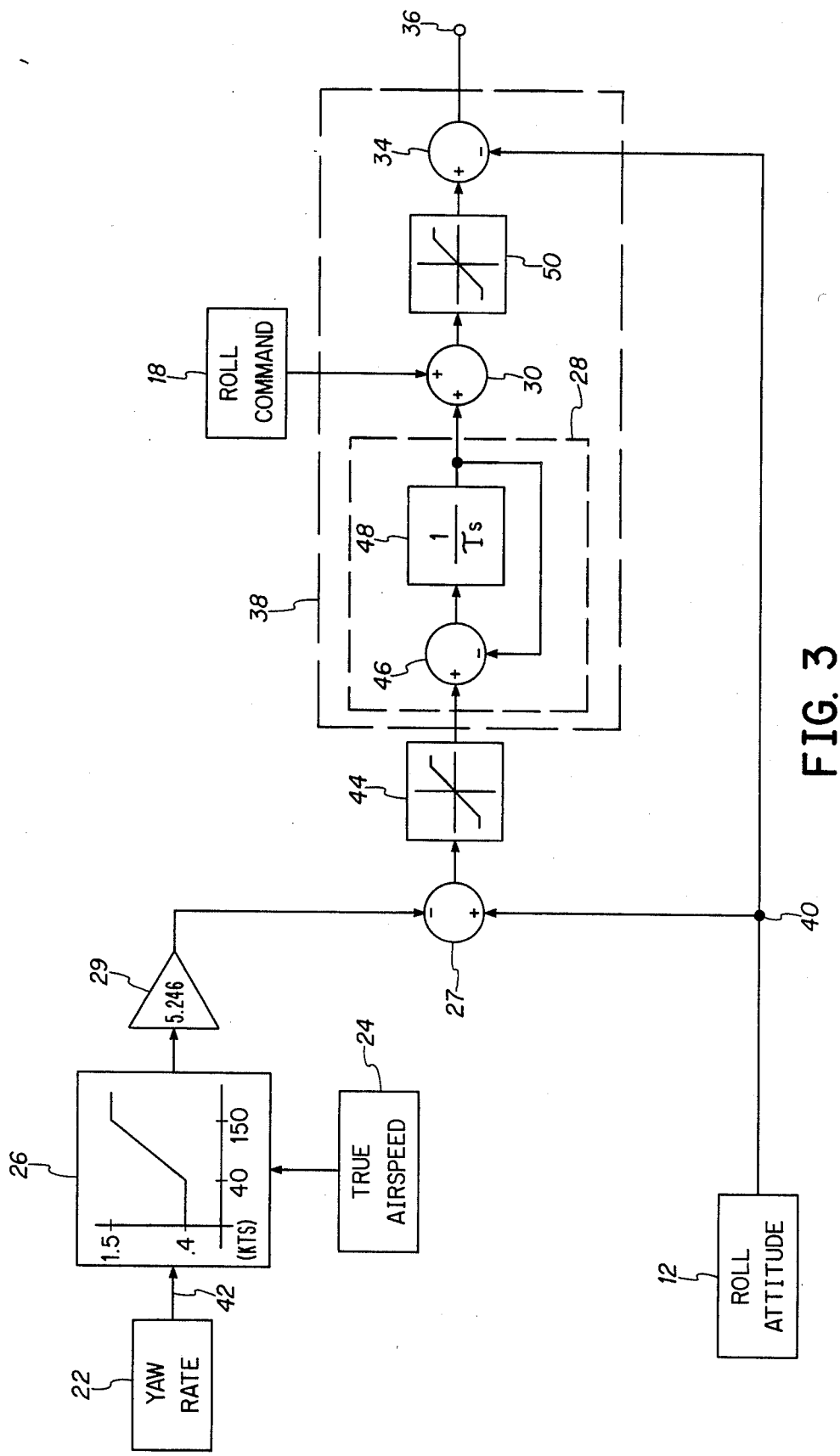
FIG. 3 is a more detailed schematic diagram showing the circuitry needed to produce the improved roll steering signal for use in an aircraft control system.

Referring now to FIG. 3, a more detailed diagram of the components forming the inventive system is illustrated. Specifically, the roll attitude signal from 12 is coupled over line 40 to the positive input of summing circuit 27 and also to the negative input of summing circuit 34. The yaw rate from 22 is provided over line 42 as one input to the multiplier 26 having the characteristics depicted in the drawing. True airspeed from 24 is provided as a second input to the multiplier 26. The output from the multiplier 26 is then coupled through a constant gain amplifier 29 (having the gain indicated) and thence as the negative input to summing circuit 27. The output from summing circuit 27 is coupled through a conventional limiter 44 which has its output coupled to the positive input of a summing circuit 46. The output from the summing circit 46 is coupled through an integrator 48 having the transfer function shown (wherein the $\tau$ may have exemplary values of 5-15 seconds), and having its output coupled to a negative input of summing circuit 46 and to a positive input of summing circuit 30.

A second positive input of summing circuit 30 receives the roll command signal from circuit 18 and sums the two inputs to provide an output to a conventional limiting circuit 50. The output from limiting circuit 50 is then coupled to the positive input of summing circuit 34 to produce an output 36 representing the roll steering signal. Typically, the yaw rate from 22 will be defined in terms of degrees per second, the roll attitude from 12 in terms of degrees, the true airspeed from 24 in terms of knots, the roll command from 18 in terms of degrees, and the roll steering from 36 in degrees. The limiters may typically be set as $\pm 3$ to 10 degrees for limiter 44 and $\pm 25$ degrees for limiter 50 although it will be apparent that the values and units may be varied without changing the inventive concept.

In operation, the feedback from integrator 48 through summing circuit 46 acts as a low pass filter 28 for the combined roll attitude and output from the multiplier 26. Likewise, the loss pass filter 28, whose output passes through summing circuit 30 and limiter 50, and the summation of the output from 50 with the roll attitude signal in summing circuit 34, acts as a high pass filter 38 on roll attitude similar to the characteristics of the high pass filter as described with respect to Fig. 1. As a result, the roll steering signal at output 36 is a more accurate representation of the response desired for aircraft control movement in systems requiring a non-zero roll attitude for normal flying conditions.

As has been previously noted, the above system enables the roll steering signal to respond with improved damping to low frequency roll attitude signals when an aircraft is being operated with a non-zero roll attitude. This complemented roll attitude is produced by combining roll attitude with a multiplication of yaw rate and airspeed to compensate for small roll attitudes. At the same time, the system is configured to act as a high pass filter for roll attitudes below predetermined limits so that in non-zero roll attitude aircraft configurations, the roll attitude will cancel itself in the output of the roll steering signal, thereby having an output similar to that obtained for zero roll attitude configurations. This condition is obtained without a loss of the low frequency response of the system and under-damping for small roll attitudes. All of these are features which are not taught or suggested in the prior at.

Although the invention has been described with reference to specific elements, time constants, and units, it will be apparent that other circuits, components, and configurations may be employed to achieve the described operation. Obviously, many other modifications and variations of the present invention are possible in light of the above teachings. It is therefore to be understood that within the scope of the appended claims, the invention may be practiced otherwise than as specifically described.

What is claimed is:

1. A system for producing an aircraft roll steering signal comprising:
   means for providing a signal representing aircraft roll attitude;
   means for providing a signal representing a combination of aircraft yaw rate and aircraft airspeed;
   means for modifying said roll attitude signal with said combined yaw rate and airspeed signal to produce a modified roll attitude signal;
   means for combining said modified roll attitude signal with an aircraft roll command signal to produce a signal output; and
   means for combining said roll attitude signal with said signal output to produce a roll steering signal.

2. The system of claim 1 wherein said means for providing a signal representing a combination of yaw rate and airspeed comprises:
   means for providing a signal representing aircraft yaw rate;
   means for providing a signal representing aircraft true airspeed;
   means for multiplying said yaw rate signal and true airspeed signal and providing a multiplied output signal; and
   means for subtracting said multiplied output signal from said roll attitude signal to provide said modified roll attitude signal.

3. The system of claim 1 wherein said means for combining said roll attitude signal with said signal output comprises a summing circuit coupled to subtract said roll attitude signal from said signal output to produce said roll steering signal.

4. The system of claim 1 further comprising means for low pass filtering said modified roll attitude signal to produce a filtered modified roll attitude signal.

5. The system of claim 4 wherein said means for combining said roll command signal and said modified roll attitude signal comprises a means for summing said roll command with said filtered roll attitude signal.

6. The system of claim 4 wherein said means for low pass filtering comprises:
   a summing circuit having a positive input, a negative input and an output, said positive input being coupled to receive said modified roll attitude signal;
   an integrator coupled to the output of said summing circuit for providing an integrated output; and
   means for coupling said integrated output to said negative input of said summing circuit for subtraction from said modified roll attitude signal, said integrated output forming said filtered modified roll attitude signal.

7. The system of claim 1 wherein said means for providing a signal representing a combination of yaw rate and airspeed comprises a means for providing a signal representing a combination of yaw rate and true airspeed.

8. A system for providing an aircraft roll steering signal, comprising:
   means for providing a signal representing aircraft roll attitude;
   means for providing a signal representing aircraft yaw rate;

means for providing a signal representing aircraft true airspeed;

means for multiplying said yaw rate signal and said true airspeed signal and providing a multiplied output signal;

means for subtracting said multiplied output signal from said roll attitude signal to provide a modified roll attitude signal;

a summing circuit having a first input, a second input, and an output, said first input being coupled to receive said modified roll attitude signal;

an integrator coupled to the output of said summing circuit for providing an integrated output;

means for coupling said integrated output to said second input of said summing circuit for subtracting said integrated output from said modified roll attitude signal and providing the difference as said summing circuit output;

means for providing an aircraft roll command signal;

means for summing said integrated output with said roll command signal to produce a signal output; and means for subtracting said roll attitude signal from said signal output to produce a roll steering output signal.

9. A helicopter control system for providing a modified roll steering signal under non-zero roll attitude flight conditions, comprising:

means for providing a signal representing a non-zero helicopter roll attitude;

means for providing a signal representing helicopter yaw rate;

means for providing a signal representing helicopter true airspeed;

means for multiplying said yaw rate signal and said true airspeed signal to provide a multiplied output;

means for combining said multiplied output with said non-zero roll attitude signal to produce a modified roll attitude signal;

means for low pass filtering said modified roll attitude signal;

means for combining said filtered roll attitude signal with a roll command signal to produce a signal output; and means for combining said signal output with said roll attitude signal to produce a roll steering signal having a non-zero value in response to roll commands and a zero value when said roll command signal is zero and said roll attitude signal is non-zero.

10. An aircraft control system for providing a roll steering signal during non-zero roll attitude flight conditions comprising:

means for providing a roll attitude signal;

means for providing a roll command signal;

means for providing a modifying signal which is not derived from said roll attitude signal and which includes a multiplier having first and second signal inputs and a multiplied output representing said modifying signal;

means for combining said roll attitude signal and said roll command signal to produce a roll steering signal; and means responsive to said modifying signal for modifying said roll attitude signal during non-zero roll attitude flight conditions and zero roll command to produce a zero roll steering signal.

11. The system of claim 10 wherein said first and second signal inputs are yaw rate and true air speed.

* * * * *